(12) United States Patent
Schneider

(10) Patent No.: US 10,458,805 B2
(45) Date of Patent: Oct. 29, 2019

(54) DRIVER ASSISTANCE SYSTEM FOR A MOTOR VEHICLE

(71) Applicant: Lucas Automotive GmbH, Koblenz (DE)

(72) Inventor: Georg Schneider, Urbar (DE)

(73) Assignee: LUCAS AUTOMOTIVE GMBH, Koblenz (DE)

( * ) Notice: Subject to any disclaimer, the term of this patent is extended or adjusted under 35 U.S.C. 154(b) by 0 days.

(21) Appl. No.: 15/837,015

(22) Filed: Dec. 11, 2017

(65) Prior Publication Data

US 2018/0180435 A1    Jun. 28, 2018

(30) Foreign Application Priority Data

Dec. 23, 2016   (DE) .................. 10 2016 015 514

(51) Int. Cl.
| | |
|---|---|
| *G06K 9/00* | (2006.01) |
| *G01C 21/36* | (2006.01) |
| *G01C 21/28* | (2006.01) |
| *G05D 1/02* | (2006.01) |
| *G01C 21/30* | (2006.01) |

(52) U.S. Cl.
CPC ......... *G01C 21/3602* (2013.01); *G01C 21/28* (2013.01); *G01C 21/30* (2013.01); *G01C 21/3647* (2013.01); *G05D 1/0223* (2013.01); *G05D 1/0246* (2013.01);
(Continued)

(58) Field of Classification Search
None
See application file for complete search history.

(56) References Cited

U.S. PATENT DOCUMENTS

| | | | |
|---|---|---|---|
| 6,560,529 B1 * | 5/2003 | Janssen .................. | G01C 21/28 340/988 |
| 9,939,813 B2 * | 4/2018 | Shashua ................. | G01C 21/32 |

(Continued)

FOREIGN PATENT DOCUMENTS

DE    102012025067    6/2014

*Primary Examiner* — Thomas G Black
*Assistant Examiner* — Demetra R Smith-Stewart
(74) *Attorney, Agent, or Firm* — Tarolli, Sundheim, Covell & Tummino LLP

(57) ABSTRACT

Driver assistance in a motor vehicle using a navigation system and a road sign display system, wherein: the navigation system accesses map data representing road segments of a road network in the geographic proximity of the motor vehicle and road signs located on the road segments, determines and provides a current position of the motor vehicle located on a road segment, and provides first information of at least one road sign which is located on a road segment to be traveled by the motor vehicle based on the current position of the motor vehicle; the road sign display system detects, based on environment information in front of and/or sideways of the motor vehicle captured via a camera unit, at least one road sign in regard to its position at a road segment and/or its meaning, and provides this second information to the driver assistance system; and wherein the first and second information are compared with each other, and, if the first and second information do not coincide, the first information provided by the navigation system is outputted for an associated signalling for the driver of the motor vehicle or a velocity affecting unit of the motor vehicle.

9 Claims, 1 Drawing Sheet

(52) U.S. Cl.
CPC ... *G05D 1/0278* (2013.01); *G05D 2201/0213* (2013.01); *G06K 9/00818* (2013.01)

(56) References Cited

U.S. PATENT DOCUMENTS

| | | | |
|---|---|---|---|
| 2010/0188288 A1* | 7/2010 | Bahlmann | B60W 30/146 342/357.23 |
| 2010/0241354 A1* | 9/2010 | Stahlin | B60W 40/02 701/532 |
| 2012/0150428 A1 | 6/2012 | Niem et al. | |
| 2015/0345974 A1* | 12/2015 | Takahashi | B60W 50/14 701/461 |
| 2016/0137127 A1* | 5/2016 | Yokochi | G06K 9/00798 348/148 |
| 2017/0072952 A1* | 3/2017 | Sim | B60W 30/146 |
| 2017/0236414 A1* | 8/2017 | Nishimura | G06K 9/00818 382/104 |
| 2017/0270377 A1* | 9/2017 | Fotta | G06K 9/00818 |
| 2017/0277716 A1* | 9/2017 | Giurgiu | G06F 17/30241 |
| 2018/0015930 A1* | 1/2018 | Sarosi | B60W 40/06 |

\* cited by examiner

DRIVER ASSISTANCE SYSTEM FOR A MOTOR VEHICLE

RELATED APPLICATION

This application claims priority from German Application No. 10 2016 015 514.0, filed Dec. 23, 2016, the subject matter of which is incorporated herein by reference in its entirety.

BACKGROUND OF THE INVENTION

A driver assistance system and method for a motor vehicle (KFZ) for evaluating traffic information for a driver or a velocity affecting unit of the motor vehicle are disclosed herein. In particular, the driver assistance system comprises a road sign display system which captures read signs in the traffic by means of a camera and makes the information thereof available to the driver. The road signs are shown, for example, on a multifunctional display and/or on the display of a navigation device. The driver can thus concentrate on the traffic on the road/route in front of him and is relieved of some of the burden in complicated situations.

PRIOR ART

Navigation systems for motor vehicles are known which provide information from a stored map database about roads and a respective position of the motor vehicle. The road sign display system detects road signs ahead of the motor vehicle in the environment of the motor vehicle. However, in particular in the case of special routing, the road signs detected by the road sign display system can lead to risky situations.

OBJECT

The driver assistance system of the motor vehicle is to be improved in order to avoid situations which may result in accidents.

Proposed Solution

There is proposed as a solution a driver assistance system of a motor vehicle defined in patent claim 1. This driver assistance system is to be connected with a navigation system and a road sign display system. The navigation system is adapted to access map data representing road segments of a road network in the geographic proximity of the motor vehicle and road signs located on the road segments. The navigation system is further adapted to determine and provide a current position of the motor vehicle located on a road segment to the driver assistance system, and to provide first information of at least one road sign to the driver assistance system, which road sign is located on a road segment to be traveled by the motor vehicle based on the current position of the motor vehicle. The road sign display system is adapted to detect, based on environment information in front of and/or sideways of the motor vehicle captured via a camera unit, at least one road sign in regard to its position at a road segment and/or its meaning, and to provide this second information to the driver assistance system. The driver assistance system is further adapted to compare the first and second information with each other and, if the first and second information do not coincide, to output the first information provided by the navigation system for an associated signalling for the driver of the motor vehicle or a velocity affecting unit of the motor vehicle.

The comparison of the first and second information can be carried out taking into consideration a series of road segments in front of and/or sideways of the motor vehicle. In some cases this permits more error-free checking.

The velocity affecting unit can be adapted to maintain or change a velocity with which the motor vehicle is currently moving. The velocity affecting unit can be a cruise control device.

For road sign detection, the driver assistance system processes three different pieces of information: "detected (with the camera system) road signs" from the road sign display system, "information of the navigation system" and "current vehicle data". The data from the navigation system and from the road sign display system are merged in the driver assistance system in order to ensure maximum availability and accuracy of the system. It is thereby possible to ensure a higher quality of information for the driver. System errors, from which current systems still suffer, are thus avoided.

Newer navigation systems, for example those which communicate by the ADASIS information protocol (for example version 2 or higher), make a large amount of road and traffic sign information available to the driver assistance system. This information relates not only to the current position of the vehicle, but also to road sections which still lie ahead (both spatially and in terms of time) of the vehicle (electronic horizon). Road sign information for these road sections is also contained therein.

At some locations, current road sign display systems are not able to display the correct velocity to the driver or to output a correct velocity affecting unit of the motor vehicle. This is the case, for example, at forks in the road, at federal road, express road or motorway exits, where the secondary route (for example the exit) runs close beside the main route (for example the motorway) for a relatively long distance, and where a different (generally lower) maximum velocity is signalled by the road signs on the secondary route than on the main route. The important factor here is not that the secondary route and the main route are straight or exactly parallel, but rather that the two routes run closely side by side, so that the camera-based road sign display system incorrectly allocates a road sign of a road section of the secondary route to a road section that is to be traveled by the motor vehicle. If in such a case or a comparable scenario, the road sign display system captures (and allocates to a road section of the main route) a road sign of the secondary route for a motor vehicle travelling on the main route, because of their spatial proximity, evaluates that road sign and transmits the lower maximum velocity displayed thereon to the driver assistance system, the velocity with which the motor vehicle travelling on the main route is moving may be reduced either by the driver, because the display is indicating that he is currently exceeding the (lower) maximum velocity, or in autonomous operation without intervention by the driver. Not only is this uncomfortable for the occupants of the motor vehicle; it also represents a risk for the following motor vehicles travelling on the main route.

With the solution proposed herein, because the driver assistance system knows, from the navigation system, that the motor vehicle will shortly arrive at a situation in which carriageways running side by side are signposted with road signs for different maximum velocities, the road sign that is detected for the motor vehicle remaining on the main route but that relates to the secondary route can actively be ignored.

The fact that different maximum velocities apply to carriageways running side by side cannot be obtained directly from the information of the navigation system (ADASIS protocol). However, the navigation system contains all the data required to detect this fact. Furthermore, the correct decision can be supported by further information, such as the lane in which the motor vehicle is currently travelling, the absence of further road signs for different maximum velocities on the left side of the carriageway, etc.

The driver assistance system can be connected to an in-car electronics system of the motor vehicle or be part thereof.

The navigation unit can be adapted to determine the current position of the motor vehicle based on a signal, in particular a GPS signal, from at least a satellite, a radio network, the global system for mobile communication (GSM), the UMTS or LTE system, an inert or autonomous system, the signal comprising geo-information (topological road, aviation and/or nautical maps). The navigation unit also accesses map data which can be stored in a memory of the navigation unit, are provided in the form of an external data carrier and/or by a cloud system.

The camera unit can be a time-of-flight, TOF, camera. The camera unit can be adapted to capture the environment of the motor vehicle by means of white light, infra-red light and/or a laser.

The at least one road sign can be a road sign which requires a current velocity of the motor vehicle to be adjusted by the driver assistance system, the velocity affecting unit or the driver of the motor vehicle. In particular, the road sign can be detected via its form, its content, a street name, place name, country name and/or point of interest, POI, name depicted on the at least one road sign, and/or a symbol (including an alphanumeric symbol) depicted on the at least one road sign.

The first and/or second information can comprise information about a colour and/or colour combination of the at least one road sign, and/or a distance and/or time from the current position of the vehicle to the road sign.

The first and/or second information can comprise information about a combination of at least the form of the at least one road sign, and/or the colour, colour combination of the at least one road sign, and/or the street name, place name (230), country name, point of interest, POI, name depicted on the at least one road sign, the symbol depicted on the at least one read sign, the distance and/or time from the current position of the vehicle to the at least one road sign.

The first and/or second information can also comprise information about a category of the at least one road sign, the categories including a warning road sign, town-/place-name road sign, instructing road sign, directional road sign, traffic facility road sign and/or supplementary road sign category. Individual road signs of the different categories are defined by the road traffic act.

For a further solution there is proposed a method for outputting traffic information to a driver or a velocity affecting unit of a motor vehicle according to claim 12. The method comprises the following steps:

As a further alternative solution there is proposed a computer program product according to patent claim 8, comprising program code sections for carrying out a method according to one of the preceding aspects when the computer program product is executed on one or more processing units.

The computer program product can be stored on one or more computer-readable storage media.

BRIEF DESCRIPTION OF THE FIGURES

Further details, features, advantages and effects of the method and devices described herein will become apparent from the following description of currently preferred variants, and from the drawings, in which.

DETAILED DESCRIPTION OF THE DRAWINGS

Figure 1:
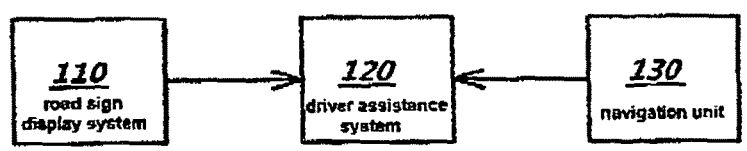
FIG. 1 is a schematic representation of a driver assistance system of a motor vehicle according to a first embodiment.

In FIG. 1 there are shown schematically a road sign display system 110, a driver assistance system 120 and a navigation unit 130, the road sign display system 110, the driver assistance system 120 and the navigation unit 130 being integrated in a motor vehicle (not shown). The road sign display system 110 is connected to the driver assistance system 120, which is likewise connected to the navigation unit 130.

The navigation unit 130 is adapted to access map data representing road segments 210 of a road network in the geographic proximity of the motor vehicle and road signs located on the road segments 210. In a variant, the navigation unit 130 is adapted to determine the current position of the motor vehicle based on a signal, in particular a GPS signal, from at least one satellite, in a variant, the signal comprises different geo-information, such as topological, road, aviation and/or nautical map information. The navigation unit 130 is further adapted to access map data which are stored in a memory of the navigation unit 130, provided in the form of an external data carrier and/or by a cloud system. The map data can be provided in the form of road segments 210 and nodes, a connection between two nodes being a road segment 210.

The navigation unit 130 provides the driver assistance system 120 with first information about at least one road sign 220 which is located at a position on a road segment 210 to be traveled by the motor vehicle based on the current position of the motor vehicle. The at least one road sign 220 can be located in front of, to the side of or behind the motor vehicle.

The road sign is preferably a road sign 220 which requires the current velocity of the motor vehicle to be adjusted by the driver assistance system 120, a velocity affecting unit or the driver of the motor vehicle. The velocity affecting unit can be a cruise control device of the motor vehicle.

In the new ADASIS information protocol (currently in version V2) for navigation systems, a large amount of road and traffic sign information is made available by the navigation system. This information relates not only to the current position of the vehicle, but also to road sections which are still ahead (both spatially and in terms of time) of the vehicle (electronic horizon).

Figure 2:
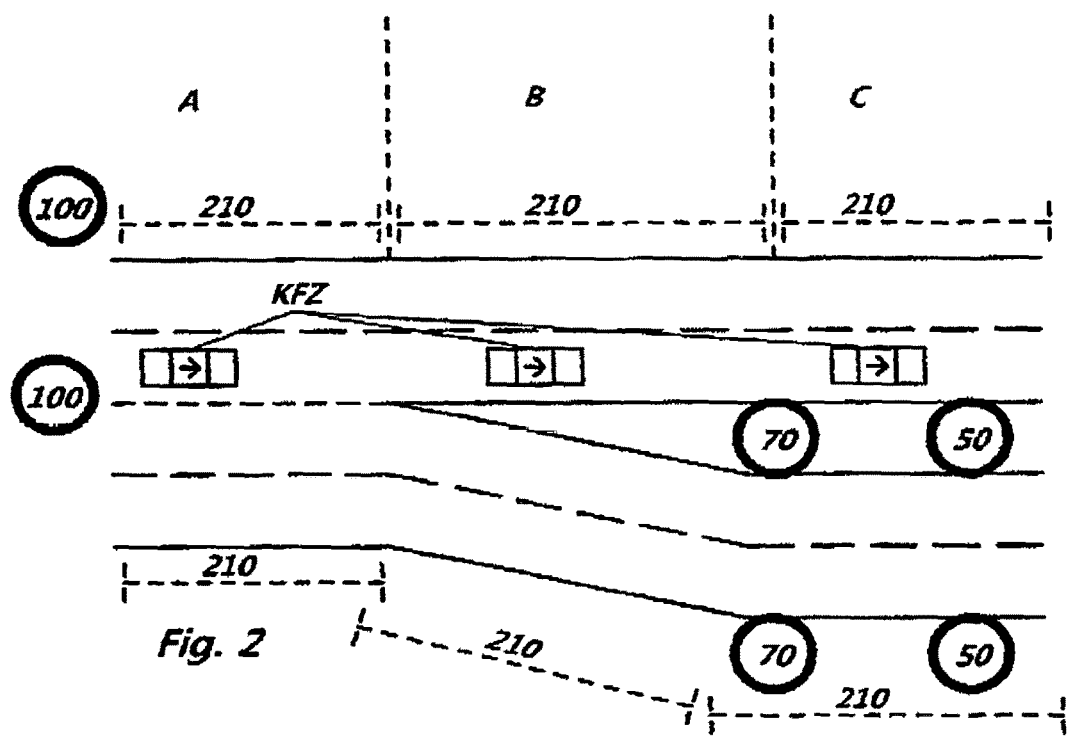
FIG. 2 is a schematic representation of a driving situation on a road.

FIG. 2 illustrates an example of a situation of a road layout, in which a conventional road sign display system 110 tends to display to a driver of a motor vehicle incorrect information regarding the current maximum permissible velocity.

As can be seen, a two-lane carriageway leads straight on, and a carriageway, likewise with two lanes, branches therefrom (at the bottom in FIG. 2). Both carriageways then run side by side at a small distance of a few meters from one another. At the beginning of section A, there are read signs limiting to a maximum velocity of "100" km/h. The road sign display system 110 of the motor vehicle travelling on the carriageway leading straight on (main route) in section A captures environment information in front of and sideways of the motor vehicle by means of a camera unit in order to detect therefrom a road sign in regard to its position at a road segment and its meaning. Since the branched lane (secondary route) runs close beside the carriageway leading straight on, the road sign mounted on this secondary route limiting to a maximum velocity of "70" km/h and the road sign limiting to a maximum velocity of "50" km/h are also within the capture range of the camera unit for the road sign display system 110. This information ("70" km/h and then "50" km/h) is provided to the driver assistance system 120. The driver assistance system 120 compares this information from the road sign display system 110 with the information from the navigation unit 130 in regard to the meaning of the road sign and optionally also in regard to its position at a road segment.

However, the information from the navigation unit 130 is a maximum velocity of "100" km/h for the motor vehicles travelling on the carriageway leading straight on.

Because the information from the road sign display system 130 does not coincide with the information from the navigation unit 130, the information provided by the navigation system 120 (that is to say in this case maximum velocity of "100" km/h) is outputted for a corresponding signalling for the driver of the motor vehicle or a velocity affecting unit of the motor vehicle.

This also takes place in consideration of a series of road segments in front and/or sideways of the motor vehicle. In particular, when the series of road segments on both sides an incorrect detection of the road sign in the correct road segment or an incorrect allocation to the correct road segment exceeds a specific probability (for example >60%), the information from the navigation unit 130 is given priority.

Further interference factors in the detection of the at least one road sign can be, for example, rain, snow or fog. These can make accurate capture of the environment and thus correct allocation of the road sign more difficult. However, the camera unit 110 is adapted clearly to detect the road sign with the aid of the second information even if the camera unit 110 does not detect the road sign completely or parts of the at least one road sign have not been captured sharply, for example due to the diffusion of light at raindrops.

The above-described variants of the method or devices and the functional and operational aspects thereof serve merely for better understanding of the structure, the functioning and the properties; they do not limit the disclosure, for example, to the exemplary embodiments. The figures are partly schematic, important properties and effects in some cases being shown on a significantly enlarged scale in order to clarify the functions, active principles, technical configurations and features. Any mode of functioning, any principle, any technical configuration and any feature that is/are disclosed in the figures or in the text can be combined freely and arbitrarily with all the claims, any feature in the text and in the other figures, other modes of functioning, principles, technical configurations and features which are contained in this disclosure or follow therefrom, so that all conceivable combinations are to be assigned to the described methods or devices. Combinations between all the individual implementations in the text, that is to say in every section of the description, in the claims, and also combinations between different variants in the text, in the claims and in the figures, are also included. For the value ranges mentioned herein, all intermediate numerical values are also disclosed.

The claims also do not limit the disclosure and thus the possible combinations of all the indicated features with one another. All the disclosed features are explicitly also disclosed herein individually and in combination with all the other features.

The invention claimed is:

1. Driver assistance system (120) of a motor vehicle, to be connected with a navigation system (130) and a road sign display system (110), wherein the navigation system (130) is adapted to
   (i) access map data representing road segments of a road network in the geographic proximity of the motor vehicle and road signs located on the road segments,
   (ii) determine and provide a current position of the motor vehicle located on a road segment to the driver assistance system (120), and
   (iii) provide first information of at least one road sign to the driver assistance system (120), which road sign is located on a road segment to be traveled by the motor vehicle based on the current position of the motor vehicle;
the road sign display system (110) is adapted to
   (i) detect, based on environment information in front of and/or sideways of the motor vehicle captured via a camera unit, at least one road sign in regard to its position at a road segment and/or its meaning, and
   (ii) provide this second information to the driver assistance system (120); and wherein
the driver assistance system is further adapted to
   (i) compare the first and second information with each other,
   (ii) if the first and second information do not coincide, output the first information provided by the navigation system (130) for an associated signalling for the driver of the motor vehicle or a velocity affecting unit of the motor vehicle, and
   (iii) in the case of routes in which a secondary route runs close beside a main route for a relatively long distance, and in which a different road sign applies on the secondary route than on the main route, and wherein the road sign display system allocates the road sign of a road section of the secondary route, on which the motor vehicle is not to travel, to the main route on which the motor vehicle is to travel, evaluate this incorrect allocation as a non-coincidence when comparing the first information with the second information.

2. Driver assistance system according to claim 1, wherein the at least one road sign is a road sign which requires a current velocity of the motor vehicle to be adjusted by the driver assistance system, the velocity affecting unit or the driver of the motor vehicle.

3. Driver assistance system according to claim 1, wherein the first and/or second information comprises:
   information about a form of the at least one road sign,
   a street name, place name depicted on the at least one road sign,
   a symbol depicted on the at least one road sign,
   a position of the road sign relative to the respective road segment, and/or
   a distance and/or time from the current position of the motor vehicle to the at least one road sign.

4. Driver assistance system according to claim 1, wherein the driver assistance system (120) is adapted to output the second information for an associated signalling for the driver of the motor vehicle or a velocity affecting unit of the motor vehicle when the first and second information coincide.

5. Driver assistance system according to claim 1, wherein the driver assistance system (120) is adapted to output one of the first information and the second information for an associated signalling for the driver of the motor vehicle or a velocity affecting unit of the motor vehicle when the first and second information coincide.

6. Motor vehicle comprising the driver assistance system according to claim 1.

7. Method for driver assistance in a motor vehicle using a navigation system and a road sign display system, wherein:
   the navigation system
   (i) accesses map data representing road segments of a road network in the geographic proximity of the motor vehicle and road signs located on the road segments,
   (ii) determines and provides a current position of the motor vehicle located on a road segment to the driver assistance system, and
   (iii) provides first information of at least one road sign which is located on a road segment to be traveled by the motor vehicle based on the current position of the motor vehicle;
   the road sign display system
   (i) detects, based on environment information in front of and/or sideways of the motor vehicle captured via a camera unit, at least one road sign in regard to its position at a road segment and/or its meaning, and
   (ii) provides this second information to the driver assistance system; and wherein
   (i) the first and second information are compared with each other,
   (ii) if the first and second information do not coincide, the first information provided by the navigation system is outputted for an associated signalling for the driver of the motor vehicle or a velocity affecting unit of the motor vehicle, and
   (iii) in the case of routes in which a secondary route runs close beside a main route for a relatively long distance, and in which a different road sign applies on the secondary route than on the main route, and wherein the road sign display system allocates the road sign of a road section of the secondary route, on which the motor vehicle is not to travel, to the main route on which the motor vehicle is to travel, this incorrect allocation is evaluated as a non-coincidence when comparing the first information with the second information.

8. Computer program product comprising program code sections for carrying out the method according to claim 7 when the computer program product is executed on one or more processing units.

9. Computer program product according to claim 8, wherein the computer program product is stored on one or more computer-readable storage media.

* * * * *